United States Patent Office 3,512,167
Patented May 12, 1970

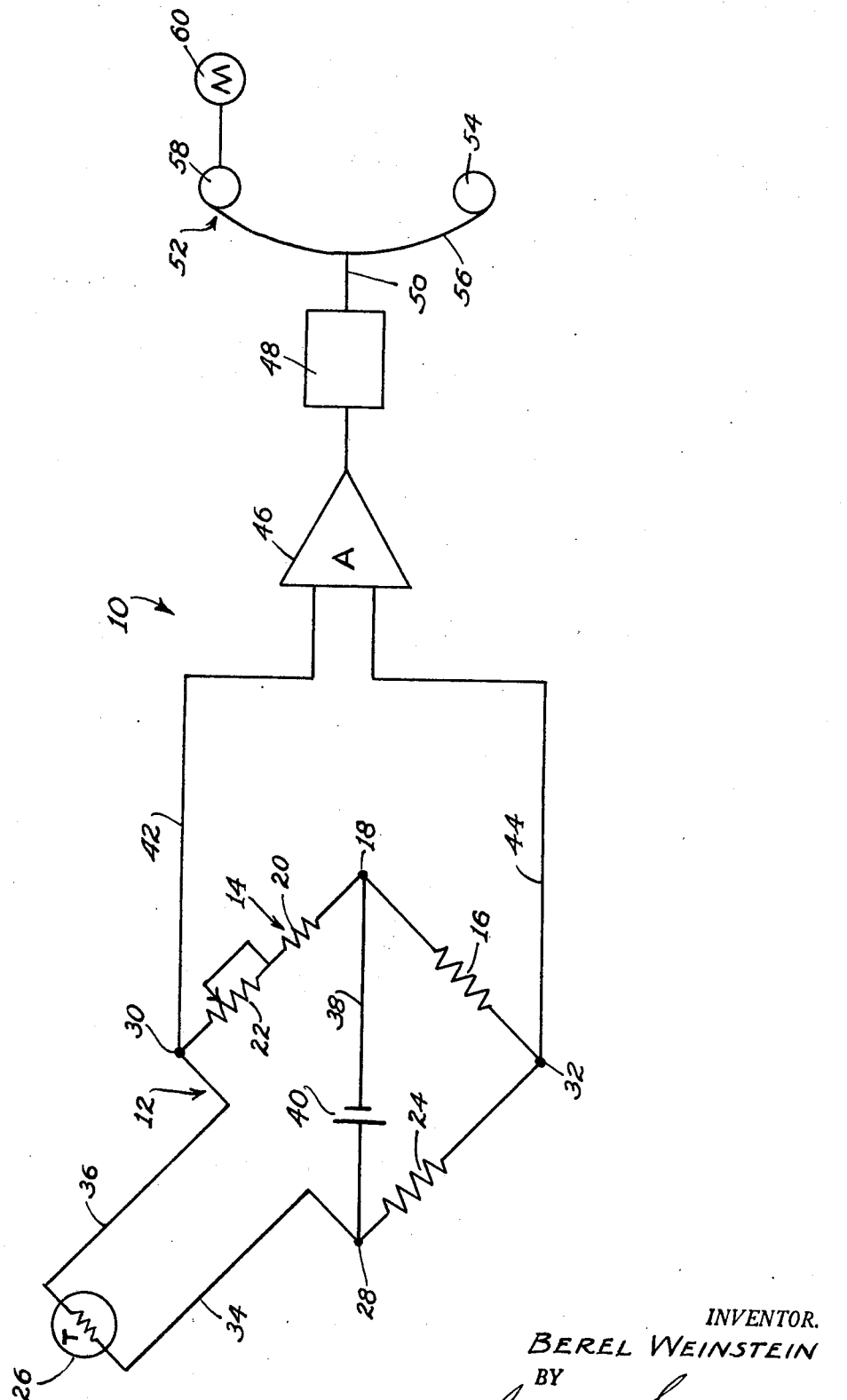

3,512,167
TEMPERATURE RECORDING APPARATUS
Berel Weinstein, New York, N.Y., assignor to Compu-
tronic Sciences, Inc., New York, N.Y.
Filed Aug. 5, 1968, Ser. No. 750,344
Int. Cl. G01d 3/06
U.S. Cl. 346—33                                    3 Claims

ABSTRACT OF THE DISCLOSURE

Temperature recording apparatus is provided which includes a bridge circuit one arm of which comprises a thermistor which is adapted to be placed on an area of the person whose temperature is to be recorded. The bridge is connected to a high gain amplifier whose output is connected to a movable stylus, the position of which is dependent upon the magnitude and polarity of the signal from the bridge circuit so that small variations in temperature will result in movement of the stylus to provide a relatively sensitive instrument. Graph paper is adapted to engage and move relative to the stylus to provide a continuous and permanent record of the temperature of the person.

---

This invention relates generally to temperature recording apparatus and, more particularly, pertains to apparatus that provides a continuous record of the temperature of a person over a preselected interval of time.

Presently, the temperature of a person is measured orally or rectally, by means of a mercury thermometer. This procedure presents many problems particularly in hospitals where many cases require a patient's temperature to be continuously monitored. As a result, a nurse's invaluable time is occupied with the simple taking of a patient's temperature. Additionally, the present method of taking temperatures leaves a great deal of room for error due to the fact that a thermometer may not have been retained for a sufficient interval of time to register properly. Moreover, the fact that the graduations on the conventional thermometer are extremely close together causes inaccurate readings even though the thermometer may have registered properly. A further disadvantage of present temperature recording techniques is due to the practice of indicating a person's temperature on a chart after reading the thermometer. More specifically, incorrect indications on such charts have been known to occur.

Accordingly, an object of the present invention is to provide an improved temperature recording apparatus.

Another object of the invention is to provide a temperature recording apparatus which continuously monitors a person's temperature.

A further object and feature of the present invention resides in the novel details of construction which provide temperature recording apparatus of the type described which is reliable in operation and economic to fabricate.

Another object of the invention is the provision of an accurate and sensitive temperature recording apparatus.

Accordingly, temperature recording apparatus constructed according to the present invention includes first and second resistors connected together at a first junction. A temperature-sensitive element whose resistance varies with temperature is connected with a third resistor at a second junction. The first and second resistors are connected in parallel with the temperature-sensitive element and the third resistor at third and fourth junctions. A source of potential is adapted to be connected between said first and second junctions and an amplifier is connected between said third and fourth junctions for amplifying the signal appearing therebetween. Temperature indicating means responsive to the amplified signal is provided for visually indicating the temperature of said temperature-sensitive element.

Other features and advantages of the present invention will become more apparent from a consideration of the following detailed description when taken in conjunction with the accompanying drawing, in which the single figure is a partial schematic circuit wiring and diagrammatic view of an apparatus constructed in accordance with the present invention.

Accordingly, temperature recording apparatus constructed according to the present invention is designated generally by the reference numeral 10 and includes a temperature-sensitive bridge circuit 12. More particularly, the bridge circuit 12 includes a resistance 14 connected to resistor 16 at a junction 18. The resistance 14 comprises the series connection of a resistor 20 and a variable resistor 22 which is used to initially balance the bridge.

The bridge 12 further includes a resistor 24 which is connected to a temperature-sensitive device 26 at a junction 28. The device 26 comprises a thermistor which is a device having a resistance which varies as a function of the ambient temperature. Hence, variations in temperature will be reflected as resistance variations of the thermistor 26.

The series circuit comprising the resistance 14 and the resistor 16 is connected in parallel with the series circuit comprising the thermistor 26 and the resistor 24. To be more specific, the thermistor 26 is connected to the resistance 14 at a junction 30. Similarly, the resistor 24 is connected to the resistor 16 at a junction 32. Thus, the elements 14, 16, 24 and 26 form the respective arms of the bridge 12. Additionally the thermistor 26 is connected to the junctions 28 and 30 by substantially long leads 34 and 36 so that the thermistor 26 may be positioned at a location remote from the other elements forming the bridge 12.

Connected between the junctions 18 and 28 by a lead 38 is a source of potential such as a battery 40. Additionally connected to the junctions 30 and 32 by respective leads 42 and 44 are the input terminals of a high gain amplifier 46. The amplifier 46 is operable to amplify the signal appearing between junctions 30 and 32 and to apply the amplified signal to its output terminals.

The output terminals of the amplifier 46 are connected to a stylus mechanism 48 which includes a stylus or writing device 50. The mechanism 48 is operable to move the stylus 50 in accordance with the magnitude and polarity of the signal applied thereto. To put this another way, the position of the stylus 50 is dependent upon the ampltiude and polarity of the output signal from amplifier 46 and will move in response to such signal variations. The mechanism 48 is conventional in construction and is readily available and, accordingly, is not shown in detail. The stylus 50 may comprise a pen having a sufficient reservoir so that the need to refill the reservoir during a cycle of operation of the apparatus 10 is eliminated.

The stylus 50 is adapted to engage and write on a graph 52 to visually indicate temperatures and to provide a permanent record. More specifically, the graph 52 includes a feed roll 54 having a supply of graph paper 56 which has temperature graduations thereon in the range under consideration. The paper 56 is moved past the stylus 50 by a take-up roll 58 which is driven by a motor 60. Accordingly, as the graph paper 56 is moved relative to the stylus 50, the stylus writes thereon to produce a continuous record of temperature readings during the time the apparatus 10 is in operation.

Alternatively, the graph paper 56 may be of the pressure sensitive type which produces indications at those points on which a pressure is applied. For this embodiment, the stylus 50 comprises a point which produces a pressure on the paper 56 so that the graph paper 56 produces a record of the path of the stylus thereon.

In operation, the variable resistor 22 is adjusted to produce a null between the junctions 30 and 32 when the thermistor 26 is at a preselected temperature such as the normal body temperature of 98.6° F. It is to be understood that for these conditions the stylus 50 will cause a mark to be entered on the graph 56 at the point corresponding to 98.6° F. The thermistor 26 then is placed on an area of the person whose temperature is to be monitored such as under his arm or in his mouth.

As the temperature of the patient varies, the resistance of the thermistor 26 similarly varies thereby unbalancing the bridge 12 to cause signal variations to appear between the junctions 30 and 32 in both magnitude and polarity depending upon whether the temperature variations are above or below the normal body temperature. The amplifier 46 amplifies these signals to cause movement of the stylus 50. Accordingly, the stylus 50 indicates the temperature variations on the graph 56. Since the graph paper 56 is moving continuously by means of the motor 60, a continuous and permanent record of the temperature of the patient is maintained. Additionally, since a relatively small change in resistance of the thermistor 26 due to correspondingly small temperature changes produces large changes in the output signal of the amplifier 46, the apparatus 10 provides a sensitive instrument for measuring temperatures which is highly accurate.

Accordingly, temperature recording or indicating apparatus has been disclosed which is simple in construction and reliable in operation and which provides a continuous and permanent record of the temperature of a person.

While preferred embodiments of the invention have been shown and described herein, it will be obvious that many additions, changes or omissions may be made in such embodiments without departing from the spirit and scope of the present invention. For example, the bridge 12 need not necessarily produce a null between junctions 30 and 32 when the thermistor 26 is at normal body temperature but may produce some base signal about which the bridge varies in accordance with temperature changes.

What is claimed is:

1. Temperature indicating apparatus for providing a graphic record of the temperature of a person including a first resistor and a second resistor connected together at a first junction, a third resistor and a thermistor having a resistance which varies with temperature connected together at a second junction, lead means connecting said first and second resistors in parallel with said third resistor and said thermistor, whereby the connection of said first resistor and said thermistor form a third junction and the connection of said second and third resistors form a fourth junction, said third and fourth junctions being stationary points of connection, at least one of said first, second and third resistors being variable, connecting means adapted to connect a source of potential between said first and second junctions, an amplifier directly connected to said third and fourth junctions for amplifying the signal appearing therebetween, and temperature indicating means responsive to the amplified signal for visually indicating the temperature of said thermistor, said temperature indicating means comprising a movable writing device the position of which varies in accordance with the magnitude and polarity of said amplified signal, and graph means engaging said writing device and movable with respect thereto to provide a continuous record of the temperature of a person, said graph means comprising a feed-roll having record paper thereon, a take-up roll for moving said record paper past said writing device, and motor means connected to said take-up roll for rotating said take-up roll.

2. Temperature indicating apparatus as in claim 1, in which said writing device includes a pen stylus for producing an inked record on said graph means.

3. Temperature indicating apparatus as in claim 1, in which said writing device comprises a stylus for applying pressure to said graph means, and said graph means comprises pressure-responsive paper adapted to produce a visual indication of the path of said stylus.

References Cited

UNITED STATES PATENTS

| | | | |
|---|---|---|---|
| 2,684,473 | 7/1954 | Shannon | 73—343.5 X |
| 2,799,758 | 7/1957 | Hutchins | 73—362 X |
| 3,031,250 | 4/1962 | Laeufer et al. | 346—76 |
| 3,190,120 | 6/1965 | Bronson | 73—343.5 |
| 3,348,415 | 10/1967 | Ash | 73—362 |

JOSEPH W. HARTARY, Primary Examiner

U.S. Cl. X.R.

346—114; 73—343.5, 362